United States Patent
Niwa

(10) Patent No.: US 10,545,269 B2
(45) Date of Patent: Jan. 28, 2020

(54) DIFFRACTIVE OPTICAL ELEMENT AND METHOD OF MANUFACTURING THE SAME

(71) Applicant: CANON KABUSHIKI KAISHA, Tokyo (JP)

(72) Inventor: Maiko Niwa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 139 days.

(21) Appl. No.: 15/691,967

(22) Filed: Aug. 31, 2017

(65) Prior Publication Data
US 2018/0074239 A1    Mar. 15, 2018

(30) Foreign Application Priority Data
Sep. 13, 2016   (JP) .................. 2016-178273

(51) Int. Cl.
G02B 5/18    (2006.01)
G02B 7/18    (2006.01)

(52) U.S. Cl.
CPC ......... *G02B 5/1814* (2013.01); *G02B 5/1838* (2013.01); *G02B 5/1857* (2013.01); *G02B 5/1895* (2013.01); *G02B 7/1815* (2013.01)

(58) Field of Classification Search
CPC ............. G02B 27/4211; G02B 5/1814; G02B 27/4272; G02B 5/1866; G02B 27/0037; G02B 5/1895; G02B 5/18; G02B 1/04; G02B 5/1852; G02B 1/041; G02B 27/4205; G02B 5/1847; G02B 5/1861;
(Continued)

(56) References Cited

U.S. PATENT DOCUMENTS 7,821,715 B2    10/2010   Suzuki et al.
8,194,321 B2    6/2012    Suzuki
(Continued)

FOREIGN PATENT DOCUMENTS

JP    2012-218394 A    11/2012
WO   2006/090614 A1   8/2006
WO   2008/032447 A1   3/2008

OTHER PUBLICATIONS

Notification of Reasons for Refusal in Japanese Application No. 2017-175376 (dated Jul. 3, 2018).
(Continued)

*Primary Examiner* — Collin X Beatty
*Assistant Examiner* — Grant A Gagnon
(74) *Attorney, Agent, or Firm* — Venable LLP

(57) ABSTRACT

A diffractive optical element prevents degradation of the optical performance of the element due to moisture absorption of the resin layers from taking place and also can prevent cracks of the resin layers and peeling of the resin layers along the interface thereof from taking place in a hot environment or in a cold environment. The diffractive optical element comprises a first layer and a second layer sequentially laid on a substrate, a diffraction grating being formed at the interface of the first layer and the second layer, the height d of the diffraction grating, the average film thickness t1 of the first layer and the average film thickness t2 of the second layer satisfying the relationship requirements expressed by the expressions of $1.1 \times d \leq t1 \leq 50$ μm and $30$ μm $\leq t2 \leq (400$ μm$-t1-d)$.

14 Claims, 4 Drawing Sheets

(58) Field of Classification Search
CPC .............. G02B 27/4216; G02B 5/1809; G02B 5/1857; G02B 27/0056; G02B 27/42; G02B 21/02; G02B 27/4288; G02B 3/08; G02B 5/1823; G02B 5/1876; G02B 27/44; G02B 5/1842; G02B 13/00; G02B 27/0018; G02B 27/1086; G02B 1/113; G02B 27/005; G02B 27/0172; G02B 27/1006; G02B 27/4238; G02B 27/4277; G02B 5/1819; G02B 5/1838; G02B 5/1871; G02B 5/188; G02B 5/3025; G02B 6/124; G02B 13/0035; G02B 13/0055; G02B 13/006; G02B 13/009; G02B 13/04; G02B 13/18; G02B 15/14; G02B 15/16; G02B 15/173; G02B 17/086; G02B 1/105; G02B 1/11; G02B 1/118; G02B 1/14; G02B 2006/12107; G02B 2027/011; G02B 2027/0116; G02B 2027/0127; G02B 2027/0178; G02B 2027/0194; G02B 2207/101; G02B 23/2407; G02B 25/001; G02B 26/0808; G02B 27/0062; G02B 27/0081; G02B 27/0101; G02B 27/0103; G02B 27/0905; G02B 27/0961; G02B 27/1066; G02B 27/1073; G02B 27/1093; G02B 27/144; G02B 27/283; G02B 27/4244; G02B 27/4266; G02B 27/4283; G02B 27/4294; G02B 3/00; G02B 3/0012; G02B 3/0056; G02B 3/0087; G02B 5/0252; G02B 5/0808; G02B 5/09; G02B 5/10; G02B 5/189; G02B 5/203; G02B 5/22; G02B 5/26; G02B 5/30; G02B 5/3058; G02B 5/3083; G02B 5/32; G02B 6/4204; G03H 1/0244; G03H 1/02; G03H 2250/10; G03H 1/0011; G03H 2001/188; G03H 1/0252; G03H 2250/36; G03H 1/0248; G03H 1/0256; G03H 1/0272; G03H 1/265; G03H 2001/0016; G03H 2001/2228; G03H 2001/2234; G03H 2250/35; G03H 1/04; G03H 1/08; G03H 2001/0033; G03H 2001/0268; G03H 2001/0284; G03H 2001/085; G03H 2001/185; G03H 2001/187; G03H 2001/2244; G03H 2001/2615; G03H 2001/2635; G03H 2001/303; G03H 2210/53; G03H 2222/16; G03H 2230/10; G03H 2240/12; G03H 2240/41; G03H 2240/42; G03H 2240/50; G03H 2250/33; G03H 2250/34; G03H 2250/40; G03H 2260/62; G03H 2270/12; G03H 2270/20; G03H 2270/24; G03H 2270/31; G03H 2270/32
USPC .......................................................... 359/576
See application file for complete search history.

(56) References Cited

U.S. PATENT DOCUMENTS

| | | |
|---|---|---|
| 9,557,455 B2 | 1/2017 | Kurata |
| 2014/0036368 A1* | 2/2014 | Kurata ............. B29D 11/00269 |
| | | 359/576 |

OTHER PUBLICATIONS

Decision of Rejection in Japanese Application No. 2017-175376 (dated Jan. 31, 2019).

* cited by examiner

DIFFRACTIVE OPTICAL ELEMENT AND METHOD OF MANUFACTURING THE SAME

BACKGROUND OF THE INVENTION

Field of the Invention

The present invention relates to a diffractive optical element and a method of manufacturing the same. More particularly, the present invention relates to a diffractive optical element to be used for an optical apparatus, which may typically be a camera or a video camera, that is manufactured by way of replica formation using photocurable resin or thermosetting resin and also to a method of manufacturing such a diffractive optical element.

Description of the Related Art

Composite optical elements that can be obtained by molding photocurable resin or thermosetting rein on substrates are being widely employed for the optical systems of cameras, video cameras and other optical apparatus. More specifically, such optical elements typically include aspheric lenses, pickup lenses and diffractive optical elements. With regard to diffractive optical elements, above all, various methods have been proposed for manufacturing diffractive optical elements. For example, Japanese Patent Application Laid-Open No. 2012-218394 discloses a contact type diffractive optical element that is manufactured by replica formation as a diffractive optical element of particularly high optical performance. According to the method of manufacturing a contact type diffractive optical element by replica formation that is disclosed in Japanese Patent Application Laid-Open No. 2012-218394, an element having a fine shape on the surface and comprising a substrate and a cured first material integrally formed on the substrate is manufactured by sequentially executing firstly a step of dropping the first material onto a mold or a substrate having a fine shape so as fill the gap between the mold and the substrate, secondly a step of curing the first material filled in the gap by applying energy to the first material and subsequently a step of peeling the cured first material and the substrate integrally away from the mold. Thereafter, a target contact type optical element can be obtained by causing a second material to tightly adhere to the above-described surface of the obtained element so as to form a second layer on the surface of the obtained element.

However, a contact type diffractive optical element as described in Japanese Patent Application Laid-Open No. 2012-218394 is accompanied by a problem that, as at least either of the two resin layers obtained by curing the first and second materials absorbs moisture and swells, the optical surface shape of the diffraction grating formed at the interface of the resin layers can be deformed and/or the refractive indexes of the resins forming the two resin layers are modified to consequently degrade the optical performance of the element. Additionally, when such a contact type diffractive optical element is operated in a hot environment or in a cold environment, there can arise a problem that the resin layers are cracked or peeled along the interface thereof due to the difference of thermal expansion coefficient between the substrate and the resins.

SUMMARY OF THE INVENTION

Therefore, the object of the present invention is to provide a diffractive optical element that can prevent degradation of the performance of the element due to moisture absorption of the resin layers from taking place and also can prevent cracks of the resin layers and peeling of the resin layers along the interface thereof from taking place in a hot environment or in a cold environment and also a method of manufacturing such a diffractive optical element.

According to the present invention, the above object is achieved by providing a diffractive optical element comprising: a substrate; a first layer arranged on the substrate; and a second layer arranged on the first layer and being in close contact with the first layer; a diffraction grating being formed at the interface of the first layer and the second layer; the diffraction grating, the first layer and the second layer satisfying the relationship requirements expressed by the expressions shown below:

$$1.1 \times d \leq t1 \leq 50 \text{ μm and}$$

$$30 \text{ μm} \leq t2 \leq (400 \text{ μm} - t1 - d),$$

Where
  d is the height of the grating part of the diffraction grating:
  t1 is the average film thickness of the first layer:
  t2 is the average film thickness of the second layer.

A method of manufacturing a diffractive optical element according to the present invention that can dissolve the above identified problems comprises: a step of filling the gap between a reversal mold of the shape of the diffraction grating to be transferred and a substrate with a first material containing at least a photocurable resin or a thermosetting resin; a step of curing the first material by applying heat or light energy to the first material; a step of peeling the cured first material away from the mold and forming a first layer on the substrate; a step of laying a second material containing at least a photocurable resin or a thermosetting resin on the first layer, the second material being different from the first material; and a step of forming a second layer being in close contact with the first layer by curing the second material by applying heat or light energy to the second material; the diffraction grating, the first layer and the second layer satisfying the relationship requirements expressed by the expressions shown below:

$$1.1 \times d \leq t1 \leq 50 \text{ μm and}$$

$$30 \text{ μm} \leq t2 \leq (400 \text{ μm} - t1 - d),$$

Where
  d is the height of the grating part of the diffraction grating:
  t1 is the average film thickness of the first layer:
  t2 is the average film thickness of the second layer.

Thus, the present invention provides a diffractive optical element that can satisfactorily suppress degradation of the performance of the element due to moisture absorption of the resin layers of the element and also can satisfactorily suppress cracks of the resin layers and peeling of the resin layers along the interface thereof in a hot environment or in a cold environment and also a method of manufacturing such a diffractive optical element.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Figure 1A:
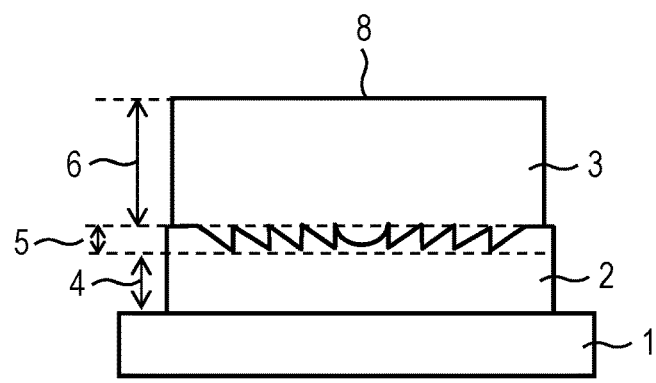
FIGS. 1A and 1B are schematic cross-sectional views of diffractive optical elements according to the present invention.
Figure 1B:
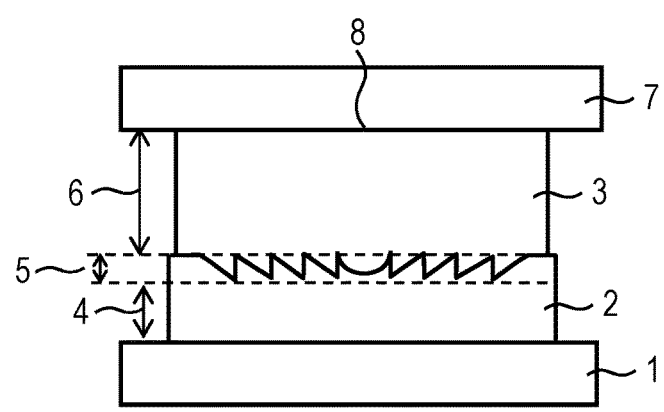

FIGS. 1A and 1B are schematic cross-sectional views of diffractive optical elements according to the present invention.

The diffractive optical element according to the present invention that is shown in FIG. 1A is a diffractive optical element formed by using two different materials, each containing at least a photocurable resin or a thermosetting resin, and having a diffraction grating. The diffractive optical element shown in FIG. 1A has a configuration such that a first resin layer 2 of a first material is formed on a substrate 1 and a second resin layer 3 of a second material is formed on the first resin layer 2 and being in close contact with the first resin layer 2. The diffraction grating is formed at the interface of the first resin layer 2 and the second resin layer 3. More specifically, the diffraction grating is formed by alternately arranging a plurality of wall surfaces that are substantially perpendicular to the surface of the substrate 1 and a plurality of optically effective surfaces at the interface such that each of the plurality of optically effective surfaces connects the top end of one of two adjacently located wall surfaces and the bottom end of the other wall surface. Note that the average film thickness 4 of the first resin layer 2 is not less than 1.1 times of the height 5 of the grating part of the diffractive optical element and not greater than 50 μm while the average film thickness 6 of the second resin layer 3 is not smaller than 30 μm and the total film thickness of the resin layers, or the sum of the height 5 of the grating part, the average film thickness 4 of the first resin layer 2 and the average film thickness 6 of the second resin layer 3, is not greater than 400 μm.

Differently stated, the diffraction grating, the first resin layer 2 and the second resin layer 3 satisfy the relationship requirements expressed by the expressions shown below:

$$1.1 \times d \le t1 \le 50 \ \mu m \text{ and}$$

$$30 \ \mu m \le t2 \le (400 \ \mu m - t1 - d),$$

Where d is the height 5 of the grating part of the diffraction grating, which is the arithmetic average of the perpendicular distances between the top ends and the bottom ends of the respective wall surfaces (distance measured perpendicularly with respect to the surface of the substrate):

t1 is the average film thickness 4 of the first resin layer 2, which is the arithmetic average of the distances between the bottom ends of the respective wall surfaces and the surface of the substrate:

t2 is the average film thickness 6 of the second resin layer 3, which is the arithmetic average of distances between the top ends of the respective wall surfaces and the top surface 8 of the second resin layer 3.

The above-described materials, each containing at least a photocurable resin or a thermosetting resin, may appropriately be selected for use from candidate materials that show satisfactory material characteristics in terms of refractive index, transmittance, viscosity, cure shrinkage rate and so on and hence can provide desired optical characteristics and an excellent formability. Examples of thermosetting resin that can be used for the purpose of the present invention include epoxy resin. Examples, on the other hand, of photocurable resin that can be used for the purpose of the present invention include acrylic resin, epoxy resin and fluororesin.

The diffraction grating is formed so as to show a shape that satisfies the requirements of desired optical characteristics as calculated on the basis of the optical system for which the diffraction grating is to be used and the material characteristics of the above-described materials. When the diffraction grating is to be used for an optical apparatus such as a camera or a video camera, it is generally formed so as to show a concentric profile. Additionally, in the case of a concentric diffraction grating, the wall surfaces thereof may be such that they show respective profiles whose heights gradually increase from the center toward the outer periphery as shown in FIGS. 1A and 1B or conversely gradually decreases from the center toward the outer periphery. Note that the optically effective surfaces may not necessarily be flat surfaces. In other words, the optically effective surfaces may be formed as spherical surfaces or aspheric surfaces regardless of the shape of the substrate. Furthermore, the shapes of the surfaces other than the optically effective surfaces may appropriately be defined so long as they do not adversely affect the optical characteristics of the diffraction grating.

A flat glass plate, a glass lens or the like that can be used for an ordinary optical apparatus can also be used for the substrate. Particularly, a substrate that has a flat surface, a spherical surface or an aspheric surface may advantageously be employed for the purpose of the present invention. Additionally, antireflection coating or thin film for improving the adhesion between the substrate and the resin layer to be arranged on the substrate may be formed on the surface of the substrate. Still additionally, film that takes a light shielding role may be formed at an end part of the substrate.

The second resin layer 3 may cover the entire surface of the first resin layer 2. Alternatively, the second resin layer 3 may cover only part of the surface of the first resin layer 2. Additionally, thin film may be formed between the first resin layer 2 and the second resin layer 3. The thin film may be a coupling film for improving the adhesion force between the first resin layer 2 and the second resin layer 3 or either a high refractive index film or a low refractive index film for reflectance adjustment.

The surface of the second resin layer 3 that is not held in contact with the first resin layer 2 and other surfaces of the diffractive optical element that do not take part in the optical performance of the element can be made to show any appropriate profile. Additionally, antireflection coating, sealing film or some other thin film may be formed on any of such surfaces.

As shown in FIG. 1B, a second substrate 7 may be put on the surface 8 of the second resin layer 3 that is not held in contact with the first resin layer 2 and being in close contact with the surface 8. With such an arrangement, if either the first resin layer 2 or the second resin layer 3 is held in contact with both of the substrates at the end thereof, the resin layer that is held in contact with both of the substrates may be regarded as the second resin layer 3 whereas the resin layer that is not held in contact with both of the substrates may be regarded as the first resin layer 2. If, on the other hand, neither of the resin layers are held in contact with both of the substrates, the resin layer having a larger diameter may be regarded as the first resin layer 2 and the resin layer having a smaller diameter may be regarded as the second resin layer 3.

Figure 2:
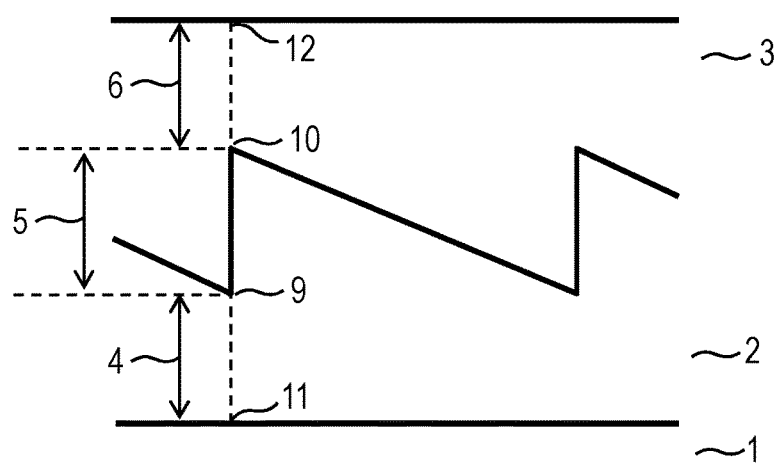
FIG. 2 is an enlarged schematic cross-sectional view of the grating part of a diffractive optical element according to the present invention, showing an exemplar shape thereof.

FIG. 2 is an enlarged schematic cross-sectional view of the grating part of a diffractive optical element according to the present invention, showing an exemplar shape thereof.

Now, the height 5 of the grating part, the average film thickness 4 of the first resin layer 2 and the average film thickness 6 of the second resin layer 3 will be described below by referring to FIG. 2. The height 5 of the grating part refers to the arithmetic average of the perpendicular distances between the bottom ends 9 (the ends located close to the substrate 1) and the top ends (the ends located remotely from the substrate 1) 10 of the respective wall surfaces at all the annular zones. The average film thickness 4 of the first resin layer 2 refers to the arithmetic average of the distances between the bottom ends 9 of the respective wall surfaces and the surface of the substrate 1 (the distances between the intersections 11 and the corresponding respective end points 9) at all the annular zones. Similarly, the average film thickness 6 of the second resin layer 3 refers to the arithmetic average of the distances between the top ends 10 of the respective wall surfaces and the upper surface 8 of the second resin layer (the surface opposite to the surface thereof that is in close contact with the first resin layer 2) (the distances between the intersections 12 and the corresponding respective end points 10) at all the annular zones.

When the average film thickness 4 of the first resin layer 2 is made smaller than 1.1 times of the height 5 of the grating part, the profile of the grating part shows large variations to make it impossible for the diffractive optical element to assure the desired level of performance. This is because stress concentration becomes remarkable at and near the top ends (end points 10 in FIG. 2) of the grating part to give rise to a defective profile there due to the relatively small average thickness 4 of the first resin layer 2. The produced defective profile is a randomly formed profile that can hardly be corrected by any appropriate measures such as initial mold shape correction. When, on the other hand, the average film thickness 4 of the first resin layer 2 is made greater than 50 µm, the resin layer is subjected to large external force at the time when the first resin layer 2 is peeled away from the reversal mold of the designed shape of the first resin layer 2 in the process of molding the first resin layer 2 to in turn easily give rise to failures such as cracked front ends of the grating-shaped resin layer after the peel of the resin layer.

For the above-described reason, a first resin layer 2 having a desired fine shape can be formed on a substrate for a diffractive optical element according to the present invention without degrading the optical performance of the diffractive optical element by making the average film thickness 4 of the first resin layer 2 not less than 1.1 times of the height 5 of the grating part and not greater than 50 µm. Particularly, the force that is applied to the front ends of the grating-shaped resin layer can further be reduced at the time when the first resin layer 2 is peeled away from the mold by preferably making the sum of the average film thickness 4 of the first resin layer 2 and the height 5 of the grating part not greater than 50 µm.

When the average film thickness 6 of the second resin layer 3 is made smaller than 30 µm, the smoothness of the top surface (the surface that is not in close contact with the first resin layer 2) 8 of the second resin layer 3 as shown in FIG. 1A will be poor to make it difficult to produce a desired optical surface so that consequently the optical performance of the obtained diffractive optical element will also be poor. This is because cure shrinkage of the material of the second resin layer 3 takes place along the grating-shaped profile of the first resin layer 2 when the average film thickness 6 of the second resin layer 3 is so small. To the contrary, when the average film thickness 6 of the second resin layer 3 is made not smaller than 30 µm, the material contained in the part of the second resin layer 3 other than the grating-shaped part thereof comes out to reinforce the grating-shaped part during the curing process of materials contained in the second resin layer 3 and thereby maintains the smoothness of the top surface 8 of the second resin layer 3 so that a desired optical surface can advantageously be obtained.

When the second resin layer 3 and the second substrate 7 are in close contact with each other as shown in FIG. 1B, the degree of smoothness of the surface 8 of the second resin layer 3 that is in close contact with the second substrate 7 (namely the top surface 8 of the second resin layer 3) is substantially held to a constant level regardless of the average film thickness 6 of the second resin layer 3. However, when the average film thickness 6 of the second resin layer 3 is made smaller than 30 µm, the grating part of the second resin layer 3 is held in a state where stress is accumulated there to in turn give rise to a deformed shape of grating and a refractive index distribution of the second resin layer 3 at the grating part thereof to consequently degrade the optical performance of the diffractive optical element as in the above-described instance where the diffractive optical element has no second substrate 7. As pointed out above, when the average film thickness 6 of the second resin layer 3 is made not smaller than 30 µm, the material contained in the part of the second resin layer 3 other than the grating-shaped part thereof comes out to reinforce the grating-shaped part during the process of curing the second material so that the accumulation of stress at the grating part of the second resin layer 3 can sufficiently be reduced and hence the diffractive optical element can be made to satisfactorily show a desired level of optical performance.

When the sum of the height 5 of the grating part, the average film thickness 4 of the first resin layer 2 and the average film thickness 6 of the second resin layer 3, which is equal to the total film thickness of the resin layers, is made greater than 400 µm, the shape of the second resin layer 3 that is not in close contact with the first resin layer 2 (namely the top surface 8 of the second resin layer 3), that of the interface where the diffraction grating is formed and that of the contact interface of the first resin layer 2 and the substrate can sometimes remarkably be deformed as the first resin layers 2 and second resin layers 3 absorb moisture. Additionally, the refractive index of the first material and that of the second material can also be changed as the first resin layers 2 and second resin layers 3 absorb moisture. Therefore, the optical performance of the diffractive optical element can remarkably be degraded when the total film thickness of the resin layers is made greater than 400 µm. Additionally, large stress arises in the inside of the resin layers in a hot or cold environment due to the difference of thermal expansion coefficient between the substrate 1 and the resin layers. As the stress rises above the yield stress of any of the materials of the diffractive optical element or above the adhesion force at the interface of the substrate 1 and the first resin layer 2, the adhesion force at the interface of the first resin layer 2 and the second resin layer 3 or the adhesion force at the interface of the second resin layer 3 and the second substrate 7, cracks can occur in the inside of the resin and/or a peeling phenomenon can appear at the interfaces in question.

Therefore, any possible occurrence of performance degradation due to moisture absorption of the resin layers and those of cracks of the resin layers and peeling at any of the interfaces in a hot or cold environment can satisfactorily be suppressed by making the total film thickness of the resin layers not greater than 400 µm. Particularly, when the total film thickness of the resin layers is made not greater than 300 µm, the influence of moisture absorption and temperature changes can be minimized and the problem of degradation of the optical performance and that of occurrence of cracks and peeling can advantageously be further reduced. Most preferably, the total film thickness of the resin layers is made not greater than 200 µm.

As pointed out above, reduction of the total film thickness of the resin layers is effective to prevent degradation of the optical performance due to occurrence of surface deformation caused by moisture absorption and/or occurrence of refractive index distribution of resin and occurrences of cracks and peeling in a hot or cold environment from taking place. On the other hand, when the total film thickness of the resin layers is reduced too much, degradation of optical performance and a fall of operation stability of the diffractive optical element can be observed. As a result of intensive research efforts of looking into the relationship between occurrences of defective shape of grating and those of refractive index distribution in diffractive optical elements due to internal stress and the average film thicknesses of the resin layers, they found the range of average film thickness that causes neither degradation of optical performance nor a fall of operation stability. Particularly, the inventors of the present invention found that the extent of influence of average film thickness on the optical performance of a diffractive optical element varies between the first resin layer 2 and the second resin layer 3. As a result of these findings, the inventors of the present invention has made it possible to manufacture a diffractive optical element in which the total film thickness of the resin layers is adjusted so as not to give rise to any degradation of optical performance and improve the environmental resistance (moisture absorption resistance).

When desired satisfactory optical characteristics are to be obtained according to the present invention by using known resin materials that can be employed for diffraction gratings with the state of art, the height 5 of the grating part needs to be at least 8 µm in view of the optical characteristics that the known materials can achieve. If, on the other hand, the height 5 of grating part is too high, flares attributable to the wall surfaces of the grating can take place to degrade the optical performance. Therefore, the height 5 of the grating part is preferably not smaller than 8 µm and not greater than 25 µm.

Now, the method of manufacturing a diffractive optical element according to the present invention will be described below by referring to FIGS. 3A to 3F.

FIGS. 3A to 3F are a schematic illustration of the steps of an embodiment of the method of manufacturing a diffractive optical element according to the present invention.

As shown in FIGS. 3A to 3F, this embodiment of the method of manufacturing a diffractive optical element according to the present invention comprises a step (a) of filling the gap between a reversal mold 13 of the shape of a desired diffraction grating and a substrate 1 with a first material 2a containing at least a photocurable resin or a thermosetting resin, a step (b) of curing the first material 2a by applying heat or light energy 14 to the first material 2a, a step (c) of peeling the cured first material 2a away from the mold 13 and forming a first resin layer 2 on the substrate 1, a step (d) of laying a second material 3a containing at least a photocurable resin or a thermosetting resin but different from the first material 2a on the first resin layer 2 (filling the gap between the first resin layer 2 and a counter member 15 with the second material 3a), a step (e) of curing the second material 3a by applying heat or energy 14 to the second material 3a and a step (f) of peeling the second resin layer 3 made of the cured second material 3a away from the counter member 15 to obtain a finished diffractive optical element. At this time, a diffraction grating is formed at the interface of the first resin layer 2 and the second resin layer 3. More specifically, the diffraction grating is formed as the interface is made to have a plurality of wall surfaces that are substantially perpendicular to the surface of the substrate 1 and a plurality of optically effective surfaces, the wall surfaces and the optically effective surfaces being alternately arranged, each of the optically effective surfaces connecting the top end of one of the adjacently located wall surfaces and the bottom end of the other wall surface. Note that the average film thickness 4 of the first resin layer 2 is not less than 1.1 times of the height 5 of the grating part of the diffractive optical element and not greater than 50 µm while the average film thickness 6 of the second resin layer 3 is not smaller than 30 µm and the total film thickness of the resin layers, or the sum of the height 5 of the grating part, the average film thickness 4 of the first resin layer 2 and the average film thickness 6 of the second resin layer 3, is not greater than 400 µm. Also note that the height 5 of the grating part refers to the arithmetic average of the perpendicular distances between the bottom ends and the corresponding top ends of the respective wall surfaces (the distances as measured in the direction perpendicular to the surface of the substrate 1) and the average film thickness 4 of the first resin layer 2 refers to the arithmetic average of the distances between the bottom ends of the wall surfaces and the surface of the substrate 1, while the average film thickness 6 of the second resin layer 3 refers to the arithmetic average of the distances between the top ends of the wall surfaces and the top surface 8 of the second resin layer 3.

The mold 13 is a reversal mold of the shape of the diffraction grating to be employed so as to make the diffraction grating provide a desired optical performance. The mold 13 may be formed by using any known material selected from metals, resins and so on. For instance, the mold 13 to be used for the purpose of the present invention may be formed by forming a plating layer of Ni, P, Cu or the like on a metal base member and then cutting or polishing the plating layer. Alternatively, the mold 13 to be used for the purpose of the present invention may be formed by molding a resin material, using a master mold. A thin film of any known type may be formed on the surface of the mold. Examples of thin films that can be formed on the mold surface include release films such as nitride films and DLC (diamond-like carbon) films and films coated with a silicon-based, fluorine-based or a non-silicon-based release agent.

Methods that can be used for filling the mold 13 with the first material 2a include a method of dropping the first material 2a on either the substrate 1 or the mold 13 or on both the substrate 1 and the mold 13 and spreading the material in the gap between the substrate 1 and the mold 13. Methods that can be used for spreading the material include a method of driving the substrate 1 and the mold 13 to come closer to each other, a method of applying a load either on the substrate 1 or the mold 13 so as to drive the substrate 1 or the mold 13, whichever appropriate, to come closer to the other, a method of filling the gap with the material and spreading the material by utilizing the own weight of either the substrate 1 or the mold 13 and a method of heating the material so as to reduce the viscosity of the material and facilitate the filling and spreading operation, all of which are known to those who are skilled in the art. Note that, so long as the material is filled within the part of the gap that is related to the intended optical characteristics, the material may or may not be filled in the remaining part of the gap.

For the purpose of curing the above listed materials, heat and/or energy 14 needs to be applied to each of the materials to be cured to the extent necessary for curing the material. More specifically, ultraviolet rays, visible light and/or thermal energy may be applied to each of the materials. Light energy and/or thermal energy 14 for curing the material may be applied to each of the materials either uniformly or in a manner of producing an energy distribution pattern. For example, energy may be applied in a way of producing an intensity distribution pattern that is dependent on the shape of the grating and/or the thickness of the related resin layer. Furthermore, light energy and thermal energy may be applied simultaneously or stepwise.

Methods that can be employed to release the above-described material from the mold 13 include a method of applying a load to the end of the substrate 1 in a direction of causing the substrate 1 to be peeled away from the mold 13 and a method of applying a load to the mold 13 in a direction of causing the mold 13 to be peeled away from the substrate 1, both of which are known to those who are skilled in the art.

Techniques that can be employed to make the second material 3a tightly adhere to the first resin layer 2 include a technique of dropping the second material 3a onto the first resin layer 2 and/or the counter member 15 and spreading the material through the gap between the first resin layer 2 and the counter member 15. A second substrate 7 may be employed as counter member 15. If such is the case, the gap between the first resin layer 2 and the second substrate 7 is filled with the second material 3a (as shown in FIG. 1B).

A diffractive optical element is obtained as the second resin layer 3 formed by curing the second material 3a is peeled away from the counter member 15. When a second substrate 7 is employed as counter member 15, a diffractive optical element is obtained simply by curing the second material 3a.

Figure 4A:
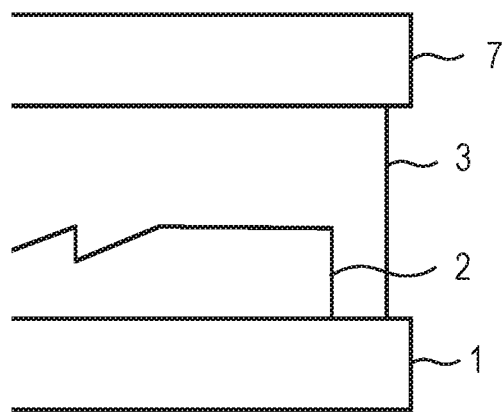
FIGS. 4A and 4B are enlarged schematic cross-sectional views of part of the outer peripheral area of a diffractive optical element according to the present invention, showing two alternative arrangements that can selectively be adopted for the illustrated part.
Figure 4B:
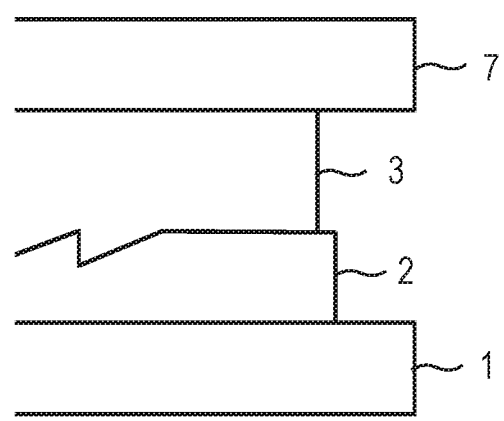

With a diffractive optical element formed by using two substrates, the first resin layer 2 and the second resin layer 3 can be identified by seeing how the first resin layer 2 and the second resin layer 3 contact the corresponding respective substrates and how the first resin layers 2 and second resin layers 3 have been spread. FIGS. 4A and 4B are enlarged schematic cross-sectional views of part of the outer peripheral area of a diffractive optical element according to the present invention, showing two alternative arrangements that can selectively be adopted for the illustrated part. The state of the outer peripheral area can roughly be like the one shown in FIG. 4A or like the one shown in FIG. 4B. FIG. 4A schematically illustrates an instance where the second resin layer 3 is formed beyond the outer peripheral edge of the first resin layer 2 that is formed by means of a mold 13. In this instance, the second resin layer 3 that is formed beyond the outer peripheral edge of the first resin layer 2 is in close contact with the two substrates. FIG. 4B schematically illustrates an instance where the spreading diameter of the second resin layer 3 is made to be less than the spreading diameter of the first resin layer 2 that is formed by means of a mold 13. In this instance, neither of the resin layers contacts both of the substrates. Thus, if either of the two resin layers contacts the two substrates, the resin layer that contacts the two substrates can be identified as the second resin layer 3 and the other resin layer can be identified as the first resin layer 2. If, on the other hand, neither of the two resin layers contacts the two substrates, the resin layer having a greater spreading diameter can be identified as the first resin layer 2 and the resin layer having a smaller spreading diameter can be identified as the second resin layer 3.

As pointed out above, with regard to filling the gap between the mold 13 and the substrate 1 with the first material 2a, the shape of the grating part can vary to a large extent when the average film thickness 4 of the first resin layer 2 is not greater than 1.1 times of the height 5 of the grating part. Thus, it is impossible to obtain the desired optical performance with such a small average film thickness 4 of the first resin layer 2. Techniques that can be used to realize a desired average film thickness for the resin layer include a technique of inserting a spacer having a desired thickness into an end part of the gap between the substrate 1 and the mold 13 to be used for forming the resin layer and a technique of conducting a filling operation, while constantly sensing the distance between the substrate 1 and the mold 13 to be used for forming the resin layer, both of which are well known to those skilled in the art. Generally speaking, photocurable resin and thermosetting resin contract as they are cured. If, at the curing time, the average film thickness 4 of the first resin layer 2 is not greater than 1.1 times of the height 5 of the grating part, stress concentration due to cure shrinkage becomes remarkable at and near the front ends of the grating part of the first resin layer 2 to in turn give rise to a defective profile for the grating part. The produced defective profile is a randomly generated profile that can hardly be corrected by any appropriate measures such as initial mold shape correction.

If, on the other hand, the average film thickness 4 of the first resin layer 2 is made to be not smaller than 50 µm, the first resin layer 2 is subjected to large force at the time of peeling the first resin layer 2 away from the mold 13. Then, defects such as cracked front ends of the grating profile are apt to occur to give rise to a fall of production yield.

For the above-described reasons, a first resin layer 2 having a desired grating profile can suitably be arranged on a substrate 1 without entailing any degradation of the optical performance of the diffractive optical element by making the average film thickness 4 of the first resin layer 2 not less than 1.1 times of the height 5 of the grating part and not greater than 50 µm. Preferably the sum of the average film thickness 4 of the first resin layer 2 and the height 5 of the grating part is made to be not greater than 50 µm so that the force applied to the bottom ends 9 of the grating part of the first resin layer 2 may be held to be below a given level at the time of peeling the first resin layer 2 away from the mold 13.

When the average film thickness 6 of the second resin layer 3 is made to be smaller than 30 μm at the time of filling the gap between the first resin layer 2 and the counter member 15 with the second material 3a, the smoothness of the surface of the second resin layer 3 that is not in close contact with the first resin layer 2 (namely the top surface of the second resin layer 3) is deteriorated to in turn make it difficult to form a desired optical surface. Then, the obtained diffractive optical element only shows a poor optical performance. This is because the second material 3a gives rise to cure shrinkage along the grating profile of the first resin layer 2 during the curing process of the second material 3a when the average film thickness 6 of the second resin layer 3 is so small. In other words, when the average film thickness 6 of the second resin layer 3 is made not smaller than 30 μm, the material contained in the part of the second resin layer 3 other than the grating-shaped part thereof comes out to reinforce the grating-shaped part during the process of curing the second material 3a so that the stress of the surface of the second resin layer 3 that is not in close contact with the first resin layer 2 is maintained to make it possible to advantageously form a desired optical surface.

When a second substrate 7 is employed, substantially a same level of surface smoothness can be ensured for the surface of the second resin layer 3 that is in close contact with the second substrate 7 regardless of the average film thickness 6 of the second resin layer 3. However, when the average film thickness 6 of the second resin layer 3 is made smaller than 30 μm, there arises a state where stress is accumulated in the grating part of the second resin layer 3 because of the cure shrinkage of the second material 3a. The accumulated stress in turn can deform the grating profile and give rise to a refractive index distribution at the grating part of the resin layer to consequently degrade the optical performance of the diffractive optical element as in the instance of a diffractive optical element that does not comprise any second substrate 7. As pointed out above, when the average film thickness 6 of the second resin layer 3 is made not smaller than 30 μm, the material contained in the part of the second resin layer 3 other than the grating-shaped part thereof comes out to reinforce the grating-shaped part during the process of curing the second material 3a so that the stress at the grating part of the second resin layer 3 can sufficiently be reduced and hence the diffractive optical element can be made to satisfactorily show a desired level of optical performance.

In a diffractive optical element manufactured so as to make the sum of the height 5 of the grating part, the average film thickness 4 of the first resin layer 2 and the average film thickness 6 of the second resin layer 3, or the total film thickness of the resin layers, greater than 400 μm, the surface of the second resin layer 3 that is not in close contact with the first resin layer 2 (namely the top surface 8 of the second resin layer 3), the interface for forming a diffraction grating and the surface of the substrate among others can become subject to deformation as the resin layers absorb moisture. Additionally, the refractive index of the first material 2a and that of the second material 3a can vary as a result of moisture absorption to consequently significantly degrade the optical performance of the diffractive optical element as pointed out earlier. Furthermore, large stress arises in the inside of the resin layers in a hot or cold environment due to the difference of thermal expansion coefficient between the substrate and the resin layers. As the stress rises above the yield stress of any of the materials or above the adhesion force at the interface of the substrate 1 and the first resin layer 2, the adhesion force at the interface of the first resin layer 2 and the second resin layer 3 or the adhesion force at the interface of the second resin layer 3 and the second substrate 7, cracks can occur in the resin layers and/or a peeling phenomenon can arise at any of the interfaces.

Therefore, any possible occurrence of performance degradation due to moisture absorption by a manufactured diffractive optical element and those of cracks of the resin layers and peeling at any of the interfaces in a hot or cold environment can satisfactorily be suppressed by making the total film thickness of the resin layers not greater than 400 μm. Particularly, when the total film thickness of the resin layers is made not greater than 300 μm, the influence of moisture absorption and temperature changes can be minimized and the problem of degradation of the optical performance and that of occurrence of cracks and peeling can advantageously be further reduced. Most preferably, the total film thickness of the resin layers is made not greater than 200 μm.

As pointed out above, reduction of the total film thickness of the resin layers is effective to prevent degradation of the optical performance of a manufactured diffractive optical element due to occurrence of surface deformation or changes in refractive index caused by moisture absorption. Reduction of the total film thickness of the resin layers is also effective to prevent cracks and peeling from appearing in the resin layers in a hot or cold environment. On the other hand, when the total film thickness of the resin layers is made too small, degradation of shape stability and a refractive index distribution due to internal stress can take place in the process of shaping the grating of the diffractive optical element to in turn degrade the optical performance of the diffractive optical element. The inventors of the present invention realized that occurrence of defective shape of grating and that of refractive index distribution due to internal stress during the process of manufacturing diffractive optical elements depends on the average film thicknesses of the resin layers and found the range of average film thickness that does not cause any degradation of optical performance and any fall of operation stability. Particularly, the inventors of the present invention found that the extent of influence of average film thickness on the optical performance of a diffractive optical element differs between the first resin layer 2 and the second resin layer 3. As a result of these findings, the inventors of the present invention has made it possible to manufacture a diffractive optical element in which the total film thickness of the resin layers is adjusted so as not to give rise to any degradation of optical performance and whose environmental resistance is significantly improved.

EXAMPLES

Example 1

The diffractive optical element of this example, which is an embodiment of diffractive optical element according to the present invention, and the method employed for preparing the diffractive optical element, which is also an embodiment of the method of manufacturing a diffractive optical element according to the present invention, will be described below by referring to FIGS. 3A to 3F.

A lens made of glass S-BSL7 (tradename, available from Ohara) having two substantially flat surfaces and also having a diameter of 55 mm and a thickness of 3 mm was employed as substrate 1. Both the first material 2a and the second material 3a used in this example contained photocurable acrylic resin as principal ingredient but the first material 2a shows a refractive index lower than the refractive index of the second material 3a.

The diffractive optical element prepared in this example was a blazed grating having a height 5 of the grating part extending between 10.5 μm and 11.3 μm and a grating width extending between 0.15 mm and 3.0 mm. The grating was formed concentrically and included a total of 74 annular zones. The surface of mold 13 and that of counter member 15 respectively showed a reversal profile of the intended profile of the grating and a flat profile. Each of the mold and the counter member 15 was prepared by forming a plating layer NiP on a base member STAVAX (tradename, available from Uddeholm) to a thickness of 150 μm and then cutting it to make it show the intended profile.

Firstly, a silane coupling process was executed on the surface of the substrate 1 that was to be brought into contact with the first material 2a (the lower surface of the substrate 1 in FIG. 3A) for the purpose of enhancing the adhesiveness of the surface relative to the first material 2a. Then, 180 mg of the first material 2a was dropped onto the center and its vicinity of the silane coupling-processed surface of the substrate 1. Subsequently, the substrate 1 carrying the first material 2a dropped on the surface thereof was arranged above the mold 13 and the substrate 1 was gradually brought closer to the mold 13 until the gap between the substrate 1 and the mold 13 was filled with the first material 2a. At this time, the operation of filling the gap between the substrate 1 and the mold 13 with the first material 2a was conducted while the distance between the substrate 1 and the mold 13 was constantly being sensed by means of a position sensor to a level of accuracy of ±3 μm in order to control the average film thickness 4 of the first resin layer 2 so as to make it show a desired value. More specifically, the filling operation was conducted so as to make the average film thickness 4 of the first resin layer 2 to be between 30 and 36 μm (see FIG. 3A).

Figure 3A:
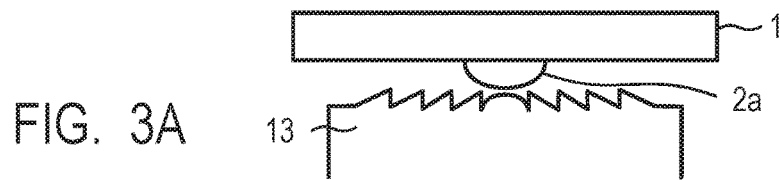
FIGS. 3A, 3B, 3C, 3D, 3E, and 3F are a schematic illustration of the steps of an embodiment of the method of manufacturing a diffractive optical element according to the present invention.
Figure 3B:
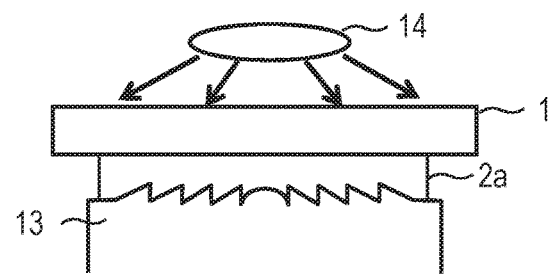
Figure 3C:
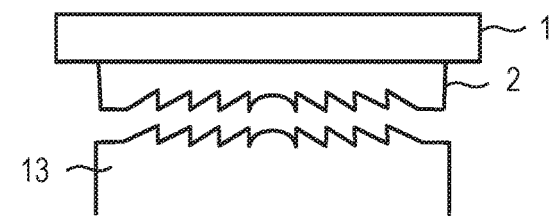
Figure 3D:
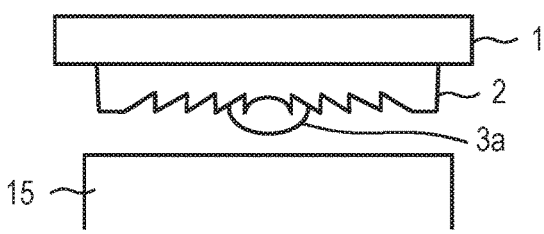

Then, UV rays 14 were irradiated onto the first material 2a filled in the gap between the substrate 1 and the mold 13 for 150 seconds by means of UL-750 (tradename, available from HOYA CANDEO OPTRONICS) to photocure the first material 2a (see FIG. 3B).

Thereafter, the cured first resin layer 2 was peeled away from the mold 13 integrally with the substrate 1 by applying force to the outer peripheral area of the substrate 1 in the direction of moving the substrate 1 away from the mold 13. The average film thickness 4 of the first resin layer 2 formed on the substrate 1 was 32 μm. The grating of the obtained first resin layer 2 did not show any random and defective profile and no cracks were observed at the front ends of the grating profile (see FIG. 3C).

Subsequently, 250 mg of the second material 3a was dropped onto the center and its vicinity of the first resin layer 2 on the substrate 1 and then the counter member 15 was gradually brought closer to the substrate 1 carrying the second material 3a dropped on the surface thereof to fill the gap between them with the second material 3a. A technique similar to the one used for controlling the average film thickness 4 of the first resin layer 2 was also employed to control the average film thickness 6 of the second resin layer 3 to make it show a desired value. More specifically, the filling operation was controlled so as to make the average film thickness 6 of the second resin layer 3 show a value between 40 and 46 μm (see FIG. 3D).

Figure 3E:
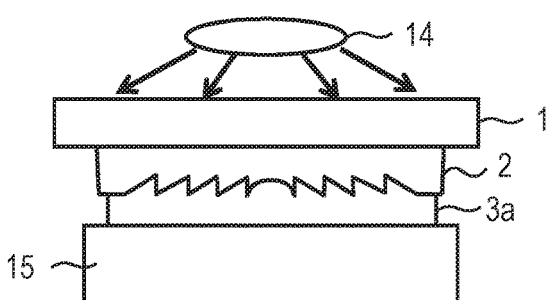

As in the instance of forming the first resin layer 2 by curing the first material 2a, UV rays 14 were irradiated onto the filled second material 3a for 150 seconds to cure the second material 3a (see FIG. 3E).

Figure 3F:
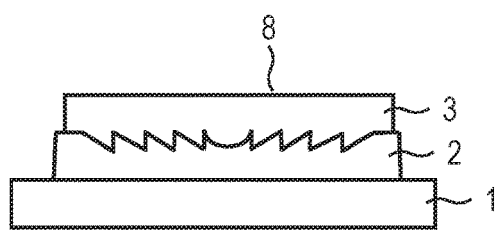

Thereafter, the diffractive optical element of this example was obtained by applying force to the outer peripheral area of the substrate 1 in the direction of moving the substrate 1 away from the counter member 15, thereby peeling the cured second resin layer 3 away from the counter member 15 integrally with the substrate 1 and the first resin layer 2 (see FIG. 3F). The average film thickness 6 of the second resin layer 3 of the obtained diffractive optical element was computationally determined so as to be equal to 46 μm from the total film thickness, the height 5 of the grating part and the average film thickness 4 of the first resin layer 2. The diffraction efficiency of the obtained diffractive optical element was satisfactory from the viewpoint of achieving the desired level of performance for the diffractive optical element.

The prepared diffractive optical element was retained in an environment of a temperature of 60° C. and a relative humidity of 90% for 20 days to check the environmental resistance of the diffractive optical element and no change in the diffraction efficiency, which is the optical characteristic in question, was observed before and after the retention in the above identified environment. Additionally, the durability of the diffractive optical element against temperature changes was checked by repeating a test cycle of leaving the diffractive optical element at −30° C. for 1 hour, then rising the temperature to 60° C. at a rate of 1° C./min, subsequently leaving the diffractive optical element at 60° C. for 1 hour and finally dropping the temperature down to −30° C. at a rate of 1° C./min for 10 times. As a result, no cracks were observed in the resin layers. Moreover, no peeling was observed at the interface.

As described above, a diffractive optical element that can remarkably suppress degradation of optical performance due to moisture absorption and occurrences of cracks and peeling at high and low temperatures and shows a satisfactory optical performance was obtained in this example. Therefore, a diffractive optical element same as the one prepared in this example can be installed in any optical apparatus such as camera or video camera.

Example 2

The diffractive optical element of this example was prepared by the method same as the one described in Example 1 but the average film thickness 4 of the first resin layer 2 was made to be equal to 14 μm. The optical performance of the obtained diffractive optical element of this example did not differ at all from that of the diffractive optical element of Example 1. Additionally, no change was observed in the optical characteristic after leaving the diffractive optical element in a high temperature and high relative humidity environment. Similarly, neither cracks nor peeling due to temperature changes was observed.

Example 3

The diffractive optical element of this example was prepared by the method same as the one described in Example 1 but the average film thickness 4 of the first resin layer 2 was made to be equal to 45 μm. The optical performance of the obtained diffractive optical element of this example did not differ at all from that of the diffractive optical element of Example 1. Additionally, no change was observed in the optical characteristic after leaving the diffractive optical element in a high temperature and high relative humidity environment. Similarly, neither cracks nor peeling due to temperature changes was observed.

Comparative Example 1

The diffractive optical element of this comparative example was prepared by the method same as the one described in Example 1 but the average film thickness 4 of the first resin layer 2 was made to be equal to 10 μm. The grating produced at the first resin layer 2 of the obtained diffractive optical element showed a random and defective profile and the extent of deformation thereof was maximally 50 nm. When compared with the diffraction efficiency of the diffractive optical element of Example 1, the diffraction efficiency of the diffractive optical element of this comparative example showed a fall of 1% due to the defective grating profile.

Comparative Example 2

The diffractive optical element of this comparative example was prepared by the method same as the one described in Example 1 but the average film thickness 4 of the first resin layer 2 was made to be equal to 7 μm. The grating produced at the first resin layer 2 of the obtained diffractive optical element showed a random and defective profile and the extent of deformation thereof was maximally 135 nm. When compared with the diffraction efficiency of the diffractive optical element of Example 1, the diffraction efficiency of the diffractive optical element of this comparative example showed a fall of 1.3% due to the defective grating profile.

Comparative Example 3

A number of diffractive optical elements were prepared in this comparative example by means of the method same as the one described in Example 1 and the average film thicknesses 4 of the first resin layers 2 were made to range from 52 μm to 55 μm. Cracks were observed at the front ends of the grating part of the first resin layer 2 of a diffractive optical element in every ten of diffractive optical elements prepared in this comparative example. When compared with the diffraction efficiency of the diffractive optical element of Example 1, the diffraction efficiency of the diffractive optical elements of this comparative example showed a fall of 0.6% due to the cracks at the front ends of the gratings.

Table 1 below shows the average film thicknesses of the first resin layers 2 and the initial optical performances (diffraction efficiencies) of the diffractive optical elements of the examples and the comparative examples that are described above. The heights of the grating parts of all the diffractive optical elements were within the range between 10.5 μm and 11.3 μm and the average film thicknesses 6 of the second resin layers 3 of all the diffractive optical elements were within the range between 40 μm and 46 μm. It will be seen from Table 1 that diffractive optical elements that are free from any diffractive profile and show a desired optical performance can be manufactured by making the average film thickness 4 of the first resin layer 2 not smaller than 1.1 times of the height 5 of the grating part and not greater than 50 μm.

TABLE 1

| | Average film thickness of 1st resin layer | Ratio relative to height of grating part | Occurrence of defective profile | Initial optical performance |
|---|---|---|---|---|
| Comparative Example 2 | 7 μm | 0.6 to 0.7 | Observed (135 nm) | Degraded (−1.3%) |
| Comparative Example 1 | 10 μm | 0.9 to 1.0 | Observed (50 nm) | Degraded (−1%) |
| Example 2 | 14 μm | 1.2 to 1.3 | Not Observed | Excellent |
| Example 1 | 32 μm | 2.8 to 3.1 | Not Observed | Excellent |
| Example 3 | 45 μm | 4.0 to 4.3 | Not Observed | Excellent |
| Comparative Example 3 | 52 μm to 55 μm | 4.6 to 5.2 | Observed (1 in every 10) | Degraded (−0.6%) |

Example 4

The diffractive optical element of this example was prepared by the method same as the one described in Example 1 but the average film thickness 6 of the second resin layer 3 was made to be equal to 39 μm. The optical performance of the obtained diffractive optical element of this example did not differ at all from that of the diffractive optical element of Example 1. Additionally, no change was observed in the optical characteristic after leaving the diffractive optical element in a high temperature and high relative humidity environment. Similarly, neither cracks nor peeling due to temperature changes was observed.

Example 5

The diffractive optical element of this example was prepared by the method same as the one described in Example 1 but the average film thickness 6 of the second resin layer 3 was made to be equal to 150 μm. The optical performance of the obtained diffractive optical element of this example did not differ at all from that of the diffractive optical element of Example 1.

Example 6

The diffractive optical element of this example was prepared by the method same as the one described in Example 1 but the average film thickness 6 of the second resin layer 3 was made to be equal to 240 μm. The optical performance of the obtained diffractive optical element of this example did not differ at all from that of the diffractive optical element of Example 1. While a fall of 0.2% was observed in the diffraction efficiency after leaving the diffractive optical element in a high temperature and high relative humidity environment if compared with Example 1 but the diffractive optical element can serve in any actual application without any problem because a change in the optical performance within 0.5% does not significantly affect the performance of the product. Additionally, neither cracks nor peeling due to temperature changes was observed.

Example 7

The diffractive optical element of this example was prepared by the method same as the one described in Example 1 but the average film thickness 6 of the second resin layer 3 was made to be equal to 330 μm. The optical performance of the obtained diffractive optical element of this example did not differ at all from that of the diffractive optical element of Example 1. While a fall of 0.4% was observed in the diffraction efficiency after leaving the diffractive optical element in a high temperature and high relative humidity environment if compared with Example 1 but the diffractive optical element can serve in any actual application without any problem because a change in the optical performance within 0.5% does not significantly affect the performance of the product. Additionally, neither cracks nor peeling due to temperature changes was observed.

Comparative Example 4

The diffractive optical element of this example was prepared by the method same as the one described in Example 1 but the average film thickness 6 of the second resin layer 3 was made to be equal to 25 µm. The second resin layer 3 of the obtained diffractive optical element showed unevenness extending along the grating profile at the surface thereof that is exposed to air. The maximum height of the unevenness was 100 nm. The diffraction efficiency of the diffractive optical element of this comparative example showed a fall of 2% due to this defective profile if compared with Example 1.

Comparative Example 5

The diffractive optical element of this example was prepared by the method same as the one described in Example 1 but the average film thickness 6 of the second resin layer 3 was made to be equal to 410 µm. The optical performance of the obtained diffractive optical element of this comparative example did not differ at all from that of the diffractive optical element of Example 1. However, if compared with Example 1, the diffraction efficiency of the diffractive optical element of this comparative example showed a fall of 1.3% after leaving the diffractive optical element in a high temperature and high relative humidity environment. Neither cracks nor peeling due to temperature changes was observed.

Table 2 below shows the average film thickness 6 of the second resin layer 3 of the diffractive optical element of each of the examples and the comparative examples that are described above. Table 2 additionally shows the initial optical performance of each of diffractive optical elements and also the optical performance of each of the diffractive optical elements that was observed after it had been left in a high temperature and high relative humidity environment. It will be seen from Table 2 that a diffractive optical element that shows a desired level of optical performance and a high environmental resistance can be manufactured by making the average film thickness 6 of the second resin layer 3 and the total film thickness of the resin layers respectively not smaller than 30 µm and not greater than 400 µm. It will also be seen that a diffractive optical element having a total film thickness of not greater than 300 µm for the resin layers thereof is preferable because such a diffractive optical component will show only a small change in the optical performance after being left in a high temperature and high relative humidity environment and that a diffractive optical element having a total film thickness of not greater than 200 µm for the resin layers thereof is more preferable because such a diffractive optical element will not show any change at all in the optical performance after being left in a high temperature and high relative humidity environment.

TABLE 2

| | Average film thickness of 2nd resin layer | Total film thickness of resin layers | Initial optical performance | Optical performance after being left in high temperature and high relative humidity environment |
|---|---|---|---|---|
| Comparative Example 4 | 25 µm | 68 µm | Degraded (−2%) | Not changed |
| Example 4 | 39 µm | 82 µm | Excellent | Not changed |
| Example 1 | 46 µm | 89 µm | Excellent | Not changed |
| Example 5 | 150 µm | 194 µm | Excellent | Not changed |
| Example 6 | 240 µm | 283 µm | Excellent | Changed (−0.2%) |
| Example 7 | 330 µm | 373 µm | Excellent | Changed (−0.4%) |
| Comparative Example 5 | 410 µm | 453 µm | Excellent | Changed (−1.3%) |

Example 8

The diffractive optical element of this example, which is another embodiment of diffractive optical element according to the present invention, and the method employed for preparing the diffractive optical element, which is also another embodiment of the method of manufacturing a diffractive optical element according to the present invention, will be described below by referring to FIGS. 5A to 5E.

A lens made of glass S-FSL5 (tradename, available from Ohara) having a diameter of 63 mm and a thickness at the center of 3 mm was employed as the first substrate 1. The surface of the substrate 1 that was used for forming a diffraction grating was a concave surface with a radius of curvature of 40 mm. A meniscus lens made of glass S-BSL7 (tradename, available from Ohara) having a diameter of 58 mm and a thickness at the center of 13 mm was employed as the second substrate 7. The surface where a diffraction grating was to be formed was a convex surface with a radius of curvature of 40 mm. A material containing photocurable acrylic resin as principal ingredient was employed as the first material 2a, while a material containing photocurable fluorine-based resin as principal ingredient was employed as the second material 3a.

The grating part of the diffractive optical element to be prepared was a blazed grating having a height 5 of the grating part between 10.5 µm and 12.8 µm and a grating width between 0.12 mm and 3.0 mm. The grating was formed concentrically and included a total of 89 annular zones. The mold 13 showed a reversal profile of the intended profile of the diffraction grating. It was prepared by forming Optcopper (tradename, available from Kyowa Industrial Co.) to a thickness of 150 µm on a base member made of STAVAX (tradename, available from Uddeholm) and then cutting it to make show an intended profile.

Firstly, a silane coupling process was executed both on the surface of the first substrate 1 and on the surface of the second substrate 7 that were to be respectively brought into contact with the first material 2a and the second material 3a for the purpose of enhancing the adhesiveness of the surfaces relative to the first material 2a and the second material 3a. Then, 300 mg of the first material 2a was dropped onto the center and its vicinity of the silane coupling-processed surface (the concave surface) of the first substrate 1. Subsequently, the first substrate 1 having the first material 2a dropped on the surface thereof was arranged above the mold 13 and the first substrate 1 was gradually brought closer to the mold 13 until the average film thickness 4 of the first resin layer 2 became to be between 30 µm and 36 µm so as to fill the gap between the mold 13 and the first substrate 1 with the first material 2a (see FIG. 5A).

Figure 5A:
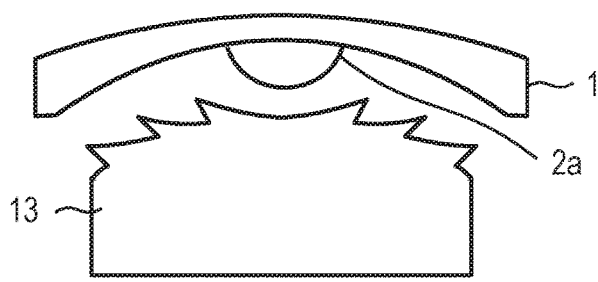
FIGS. 5A, 5B, 5C, 5D, and 5E are a schematic illustration of the steps of another embodiment of the method of manufacturing a diffractive optical element according to the present invention.
Figure 5B:
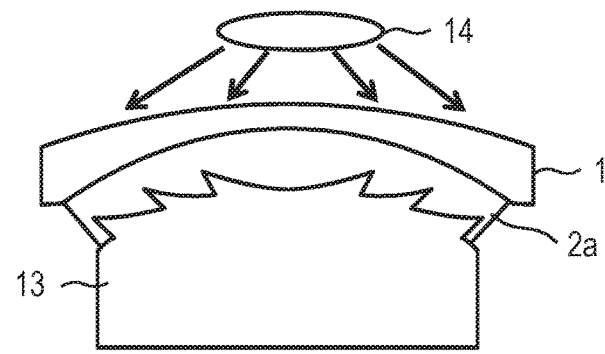
Figure 5C:
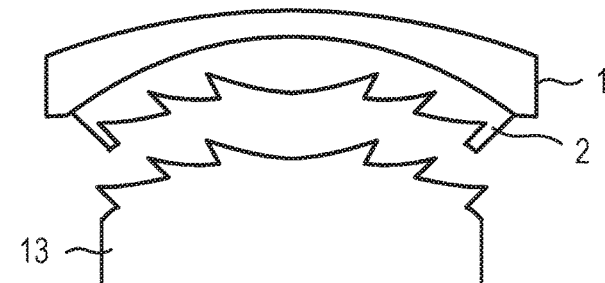
Figure 5D:
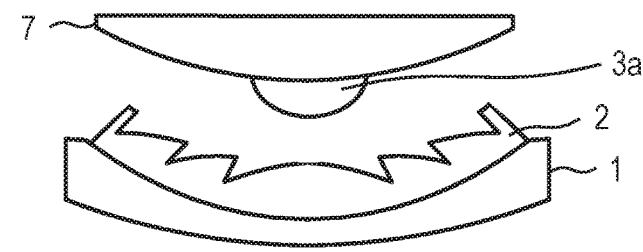
Figure 5E:
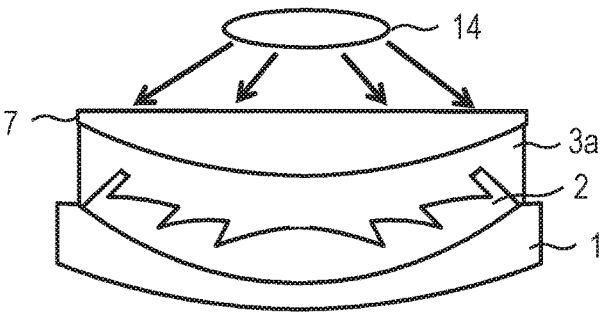

Then, UV rays 14 were irradiated onto the first material 2a filled in the gap for 300 seconds as in Example 1 to photocure the first material 2a to produce the first resin layer 2 (see FIG. 5B).

Thereafter, the first resin layer 2 and the substrate 1 were integrally peeled away from the mold 13 by applying force to the outer peripheral area of the substrate 1 in the direction of moving the substrate 1 away from the mold 13. The average film thickness 4 of the first resin layer 2 formed on the substrate 1 was 32 µm. The grating of the obtained first resin layer 2 did not show any random and defective profile and no cracks were observed at the front ends of the grating profile (see FIG. 5C).

Subsequently, 190 mg of the second material 3a was dropped onto the center and its vicinity of the silane coupling-processed surface (the concave surface) of the second substrate 7 and then the second substrate 7 carrying the second material 3a dropped thereon and the first substrate 1 carrying the first resin layer 2 formed thereon were gradually brought closer to each other to fill the gap between them with the second material 3a. At this time, the filling operation was conducted so as to make the average film thickness 6 of the second resin layer 3 show a value between 42 µm and 48 µm. Then, UV rays 14 were irradiated onto the second material 3a to cure the second material 3a as in the instance of forming the first resin layer 2 and obtain the diffractive optical element of this example. The average film thickness 6 of the second resin layer 3 of the obtained diffractive optical element was computationally determined so as to be equal to 46 µm from the total film thickness of the resin layers, the height 5 of the grating part and the average film thickness 4 of the first resin layer 2. The diffraction efficiency of the obtained diffractive optical element was satisfactory for achieving the desired level of performance.

The prepared diffractive optical element was retained in a high temperature and high relative humidity environment for 20 days to check the environmental resistance of the diffractive optical element and no change was observed in the diffraction efficiency, which is the optical characteristic in question, before and after the retention in the above identified environment. Additionally, the durability of the diffractive optical element against temperature changes was checked by repeating a test cycle of leaving the diffractive optical element in a high temperature environment and then in a low temperature environment for ten times. As a result, no cracks were observed in the resin layers. Additionally, no peeling was observed at the interface of the resin layers.

As described above, the diffractive optical element of this example could remarkably suppress degradation of optical performance due to moisture absorption and occurrences of cracks and peeling at hot and cold temperatures. Additionally, the diffractive optical element of this example showed a satisfactory optical performance. Thus, a diffractive optical element like that of this example can reliably be installed in any optical apparatus such as a camera or a video camera.

Example 9

The diffractive optical element of this example was prepared by the method same as the one described in Example 8 but the average film thickness 6 of the second resin layer 3 was made to be equal to 150 µm. The optical performance of the obtained diffractive optical element of this example did not differ at all from that of the diffractive optical element of Example 8. Additionally, no change was observed in the optical characteristic of the diffractive optical element after it had been left in a high temperature and high relative humidity environment. Similarly, neither cracks nor peeling due to temperature changes was observed.

Example 10

The diffractive optical element of this example was prepared by the method same as the one described in Example 8 but the average film thickness 6 of the second resin layer 3 was made to be equal to 240 µm. The optical performance of the obtained diffractive optical element of this example did not differ at all from that of the diffractive optical element of Example 8. Additionally, no change was observed in the optical characteristic of the diffractive optical element after it had been left in a high temperature and high relative humidity environment. In a test of exposing the diffractive optical element to temperature changes, the second resin layer 3 was peeled away from the second substrate 7 by less than 1 mm in the outer peripheral area of the diffractive optical element but no change was observed in the optical performance of the element.

Example 11

The diffractive optical element of this example was prepared by the method same as the one described in Example 8 but the average film thickness 6 of the second resin layer 3 was made to be equal to 330 µm. The optical performance of the obtained diffractive optical element of this example did not differ at all from that of the diffractive optical element of Example 8. Additionally, no change was observed in the optical characteristic of the diffractive optical element after it had been left in a high temperature and high relative humidity environment. In a test of exposing the diffractive optical element to temperature changes, the second resin layer 3 was peeled away from the second substrate 7 and cracks occurred in the second resin layer 3 by less than 1 mm in the outer peripheral area of the diffractive optical element but no change was observed in the optical performance of the element.

Comparative Example 6

The diffractive optical element of this comparative example was prepared by the method same as the one described in Example 8 but the average film thickness 6 of the second resin layer 3 was made to be equal to 400 µm. The optical performance of the obtained diffractive optical element of this example did not differ at all from that of the diffractive optical element of Example 8. Additionally, no change was observed in the optical characteristic of the diffractive optical element after it had been left in a high temperature and high relative humidity environment. In a test of exposing the diffractive optical element to temperature changes, cracks were produced in the first resin layer 2 and also in the second resin layer 3 across the entire diffractive optical element to make the diffractive optical element inoperative.

Table 3 below shows the average film thickness 6 of the second resin layer 3 of each of the diffractive optical elements of the examples and the comparative example that are described above. Table 3 also shows occurrence or non-occurrence of cracks and that of peeling when each of the diffractive optical elements was exposed to temperature changes. It will be seen from Table 3 that a diffractive optical element according to the present invention operates well in a temperature-changing environment when the total film thickness of the resin layers is made not greater than 400 μm. Additionally, the diffractive optical element shows an improved durability in a temperature-changing environment when the total film thickness of the resin layers is made not greater than 300 μm. Moreover, neither cracks nor peeling is observed in the diffractive optical element when the total film thickness of the resin layers is made to be not greater than 200 μm. Therefore, the use of a diffractive optical element whose resin layers show such a small total film thickness is preferable.

TABLE 3

| | Average film thickness of 2nd resin layer | Total film thickness of resin layers | Occurrence of cracks and/or peeling in temperature-changing environment |
|---|---|---|---|
| Example 8 | 46 μm | 91 μm | Not Observed |
| Example 9 | 150 μm | 195 μm | Not Observed |
| Example 10 | 240 μm | 285 μm | Observed (peeling of 1 mm at outer periphery) |
| Example 11 | 330 μm | 373 μm | Observed (cracks and peeling of 1 mm at outer periphery) |
| Comparative Example 6 | 400 μm | 443 μm | Observed (cracks across entire element) |

Example 12

The diffractive optical element of this example was prepared by the method same as the one described in Example 8 but the height 5 of the grating part was made to be between 22 μm and 23 μm. The environmental resistance of the obtained diffractive optical element of this example did not differ at all from that of the diffractive optical element of Example 8. The influence of flares was examined by intentionally exposing the grating part to light and it was found that exposure to light of the grating part did not affect at all the performance of the product.

Comparative Example 7

The diffractive optical element of this example was prepared by the method same as the one described in Example 8 but the height 5 of the grating part was made to be between 27 μm and 28 μm. The environmental resistance of the obtained diffractive optical element of this example did not differ at all from that of the diffractive optical element of Example 8. The influence of flares was examined by intentionally exposing the grating part to light and it was found that exposure to light of the grating part affected the performance of the product to make the diffractive optical element inoperative.

From the above-described Example 12 and Comparative Example 7, it was confirmed that the influence of flares on the performance of the diffractive optical element can be minimized by making the height 5 of the grating part of the diffractive optical element not greater than 25 μm.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-178273, filed Sep. 13, 2016, which is hereby incorporated by reference herein in its entirety.

What is claimed is:

1. A diffractive optical element comprising:
a substrate;
a first layer arranged on the substrate; and
a second layer arranged on the first layer,
wherein a diffraction grating is formed at an interface of the first layer and the second layer, and
wherein when d is a height of a grating part of the diffraction grating:
t1 is an average thickness of the first layer, excluding the height of the grating part, and
t2 is an average thickness of the second layer, excluding the height of the grating part, and
wherein d, t1, and t2 are such that:
d is at least 8 μm;
t1 is from 1.1 times d to 50 μm;
t2 is at least 30 μm; and
a sum of d, t1, and t2 is not greater than 400 μm.

2. The diffractive optical element according to claim 1, wherein a sum of t1 and d is not greater than 50 μm.

3. The diffractive optical element according to claim 1, wherein the sum of d, t1, and t2 is not greater than 300 μm.

4. The diffractive optical element according to claim 1, wherein the sum of d, t1, and t2 is not greater than 200 μm.

5. The diffractive optical element according to claim 1, wherein d is 8 μm to 25 μm.

6. The diffractive optical element according to claim 1, wherein the first layer and the second layer comprise different resins.

7. The diffractive optical element according to claim 1, wherein the substrate is glass.

8. An optical apparatus comprising at least one optical element, wherein the optical element is the diffractive optical element according to claim 1.

9. The optical apparatus according to claim 8, wherein the diffractive optical element is a lens, and
wherein the optical apparatus is a camera.

10. A method of manufacturing a diffractive optical element having a diffraction grating formed at an interface of a first layer and a second layer, the method comprising:
a step of filling a gap between a reversal mold of a shape of the diffraction grating to be transferred and a substrate with a first material containing at least a photocurable resin or a thermosetting resin;
a step of curing the first material by applying heat or light energy to the first material;
a step of peeling cured first material away from the mold and forming the first layer on the substrate;
a step of laying a second material containing at least a photocurable resin or a thermosetting resin on the first layer, the second material being different from the first material; and
a step of forming the second layer on the first layer by curing the second material by applying heat or light energy to the second material,
wherein when d is a height of a grating part of the diffraction grating:
t1 is an average film thickness of the first layer, excluding the height of the grating part, and
t2 is an average film thickness of the second layer, excluding the height of the grating part, and wherein d, t1, and t2 are such that:
  d is at least 8 μm;
  t1 is from 1.1 times d to 50 μm,
  t2 is at least 30 μm, and
  a sum of d, t1, and t2 is not greater than 400 μm.

11. The method according to claim 10, wherein a sum of t1 and is not greater than 50 μm.

12. The method according to claim 10, wherein the sum of d, t1, and t2 is not greater than 300 μm.

13. The method according to claim 6, wherein the sum of d, t1, and t2 is not greater than 200 μm.

14. The method according to claim 10, wherein d is 8 μm to 25 μm.

\* \* \* \* \*